United States Patent [19]
Hogan et al.

[11] 4,136,061
[45] Jan. 23, 1979

[54] CONTINUOUS, MULTIPLE ZONE FLUIDIZED BED FOR PARTICLE TREATER

[75] Inventors: John P. Hogan; Donald R. Witt, both of Bartlesville, Okla.

[73] Assignee: Phillips Petroleum Company, Bartlesville, Okla.

[21] Appl. No.: 858,037

[22] Filed: Dec. 6, 1977

Related U.S. Application Data

[63] Continuation-in-part of Ser. No. 718,300, Aug. 27, 1976, abandoned.

[51] Int. Cl.² ............................ B01J 29/00; B01J 8/00; C01B 17/82
[52] U.S. Cl. ..................................... 252/458; 422/142; 422/144; 422/145; 422/193
[58] Field of Search ............. 252/458; 23/284, 288 G, 23/288 S

[56] References Cited
U.S. PATENT DOCUMENTS

| | | | |
|---|---|---|---|
| 1,836,301 | 12/1931 | Bechthold | 23/288 G |
| 2,689,210 | 9/1954 | Leffer | 23/288 S |
| 2,697,653 | 12/1954 | Nicholson | 23/288 S |
| 2,799,558 | 7/1957 | Smith et al. | 23/284 X |
| 2,833,622 | 5/1958 | Roberts et al. | 23/288 S |
| 3,573,224 | 3/1971 | Strelzoff et al. | 252/376 |
| 3,661,799 | 5/1972 | Cartmell | 252/417 |
| 3,931,045 | 1/1976 | Rush | 252/416 |

*Primary Examiner*—Carl Dees

[57] ABSTRACT

A multiple zone apparatus for treating particulate solids and a method for treating particulate solids in seriatim multiple zones are provided. Particulate solids treatment such as the activation of chromium-silica olefin polymerization catalyst is carried out continuously by employing multiple fluidized beds with overflow of solids from one bed to the next lower bed. Each bed has its own source of heat and fluidizing gas to permit stepwise treatment of the particulate solids as particles pass through the system. Temperatures in each zone can be regulated for treatment of the solids in a predetermined manner. In a preferred embodiment each bed is transversely divided with a partition containing a hole sized for forwarding flow from the solids inlet side of the bed to the outlet side without backflow.

14 Claims, 4 Drawing Figures

CONTINUOUS, MULTIPLE ZONE FLUIDIZED BED FOR PARTICLE TREATER

This is a continuation-in-part of application Ser. No. 718,300, filed Aug. 27, 1976, now abandoned.

BACKGROUND OF THE INVENTION

This invention relates to the continuous treatment of particulate solids. In one of its aspects this invention relates to an apparatus for treating particulate solids in a series of fluidized beds. In another of its aspects this invention relates to a method for activating a continuous flow of particulate catalyst.

In the preparation of polymerization catalysts as described, for example, in U.S. Pat. Nos. 2,825,721 and 3,887,494, generally, such catalysts are activated in a batch operation with an oxygen-containing dry fluid, such as air, at temperatures ranging from about 350° F (177° C) to about 2000° F (1093° C) in a fluidized bed for about 0.1 hour to about 50 hours. In a commercial operation it would be particularly advantageous to be able to continuously activate such a catalyst so that freshly activated catalyst could be available for a polymerization process at any time. In seeking to develop such a continuous process we have discovered an apparatus and method in which not only particulate catalyst, especially ethylene polymerization catalyst comprising a chromium compound and silica or a silica admixed with up to about 20 weight percent of one or more metal oxides can be continuously activated to produce polymers of melt index comparable to the melt index produced using catalysts that have been activated batch-wise, but also our treatment system is well adapted to the continuous treatment of particulate solids in other applications in which it is desirable to contact particulate material with hot gases in a fluidized bed.

It is therefore an object of this invention to provide method and apparatus for the multiple zone contacting of particulate solids with a treating gas. It is another object of this invention to provide method and apparatus for the activation of particulate catalysts, especially ethylene polymerization catalysts. It is still another object of this invention to provide activated particulate catalysts produced in a continuous activation process.

Other aspects, objects, and the various advantages of this invention will become apparent upon reading the specification and the appended claims in light of the drawings attached hereto.

STATEMENT OF THE INVENTION

Figure 1:
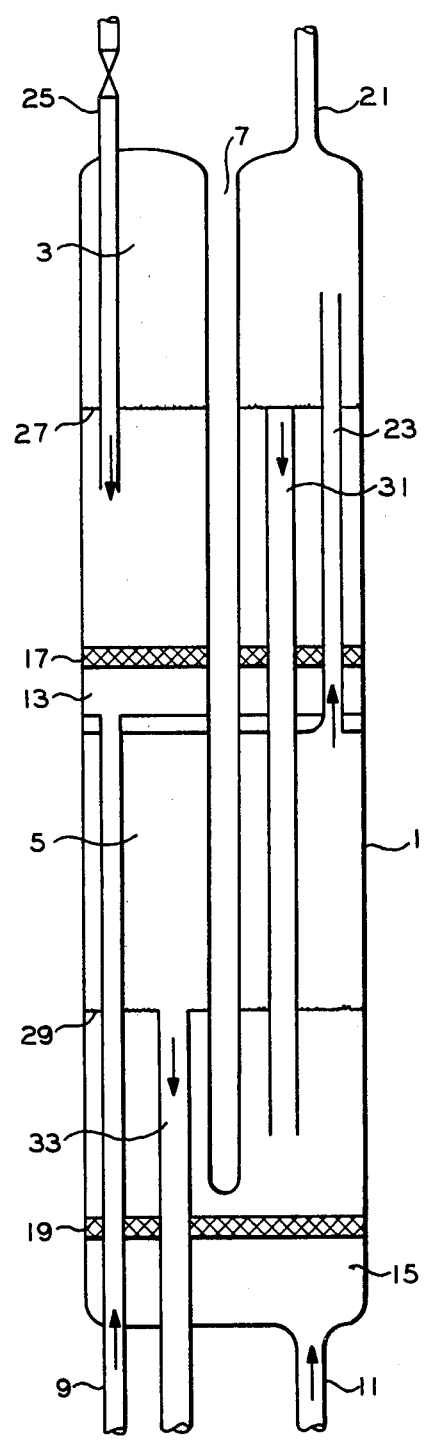
FIG. 1 is a representation of a laboratory model 2-stage continuous catalyst activator as used in preparing catalysts for the examples of this specification.

According to this invention, a multiple zone apparatus for contacting particulate solids with treating gas is provided in which (1) each zone is a chamber comprising: a floor of porosity sufficient to admit fluidizing gas therethrough and to retain thereon the particulate solids to be treated; a means for supplying fluidizing gas through the floor; for conducting particulate solids from the chamber a means having a port sufficiently above the floor to maintain a level of fluidized particles above the floor; for conducting particulate solids into the chamber a means positioned to discharge at a level lower than the port for conducting particulate solids from the chamber; and for conducting gases from the chamber a means having opening above the level of fluidized particulate solids; (2) the multiple zones arranged for gravity overflow of treated particles from each zone to a next treatment zone with overflow from the apparatus from the last treating zone; and (3) means for conducting gases from the zones arranged to conduct gases to a common collection point without intermingling the gases with fluidized particulate solids in another chamber.

A method for contacting particulate solids with treating gas is also provided in which particulate solids are passed downward through a series of zones, in each zone admitting particulate solids below the upper level of a fluidized bed of particulate solids and overflowing solids from the upper limit of the fluidized bed by gravity flow into the next lower treatment zone and conducting fluidizing gases from each treatment zone to a common collection point without intermingling these gases with fluidized particulate solids in another chamber.

In an embodiment of the invention each chamber of the apparatus as described above is divided transversely by a partition extending above the height of the fluidized bed. The partition divides the chamber so that the means for conducting particles into the chamber is on a first side of the partition and the means for conducting particulate solids from the chamber is on a second side of the partition. There is a transfer hole in the partition sized to permit flow of particulate solids from the first side of the partition to the second side, but of sufficient size to permit no appreciable backflow to the first side of the partition.

A method is also provided for contacting particulate solids with treating gas in which the solids are passed into the portion of the chamber on the first side of the partition, through the transfer hole and into the portion of the chamber on the second side of the partition in each of the series of treating zones as the solids are passed downward through the treating apparatus. This effectively increases the contacting efficiency of each zone of the treating apparatus.

This invention will be discussed below in this specification referring to preferred embodiments in which particulate catalyst is activated continuously for use in a polymerization process. Through this illustrative embodiment the broader aspects of this invention will be apparent to those skilled in the art.

The apparatus of this invention consists of a plurality of vertically disposed zones, each zone being supplied individually at controllable rates with its own source of dry, heated molecular oxygen-containing fluid for fluidizing and at least partially activating the catalyst in that zone. Fluid leaving each zone passes to a common duct and then through a cyclone to recover any entrained catalyst particles before being released into the atmosphere. The bottom of each zone is constructed of a porous material that retains its structural integrity at the activation temperatures employed. Generally, the porous bottom can be formed from high melting point alloys of nickel, iron and at least one other metal selected from chromium, molybdenum, silicon, copper, and aluminum with alloys of nickel, iron and chromium being especially preferred. Examples of such alloys are 316 stainless steel, Inconel and Hastelloy metals. A presently preferred porous material can be formed by sintering Inconel 600 powder on Inconel 600 wire screen to obtain a material having a mean pore size of about 30 microns. Means for conducting particulate solids such as a tube or tubes extending upwardly the desired height above each bed, i.e., from about 2 to about 8" (5-20 cm) and downwardly about ¼ to 4/5 or more of the distance into the height of the next lower fluidized bed is used to conduct the catalyst from one bed to the next lower one. The diameter of the tube or tubes is sufficient to maintain the desired throughput of catalyst by gravity flow at the chosen feed rate for the desired average residence time of particles in that zone. Generally, the diameter of the tubes will range from about 0.2 to 2 inches (0.5-5 cm). The shape of each zone is selected to obtain the most uniform flow of fluidizing gas through each bed. Generally, it is preferred that each zone is constructed with a circular or annular cross-section.

In the embodiments of the invention in which there are partitioned zones the apparatus contains, in addition to the components described above, a partition dividing the chamber from the floor to a height above that of the contained fluidized bed. The partition extends entirely across the chamber and contains a particle transfer hole sized to permit a maximum flow from the first side of the partition to the second side of the partition with minimum backflow. The particle transfer hole is sized generally within the range of about 0.008 to about 0.025 times the diameter of the treating apparatus, i.e., a treating apparatus having a diameter of about 7.5 inches would contain chambers having partitions with particle transfer holes ranging in size from about 1/16 inch to about 3/16 inch diameter. It has been found that circular holes so sized will provide the desired flow characteristics for catalyst sized to pass through a 50 mesh screen and be retained on a 400 mesh screen (U.S. Sieve), i.e., passing through an 0.297 mm opening and retained on an 0.037 mm opening when using flow rates for catalyst and treating air which balance throughput of catalyst against overhead loss of catalyst from excess treating fluid flow.

The number of zones of the apparatus can be varied according to the nature and contained moisture of the catalyst to be activated and the desired residence time of the catalyst in each zone. For chromium-silica, chromium-silica-titania, and the like catalysts that are used in ethylene polymerization, the number of zones will usually range from about 2 to about 10 or more, preferably from about 4 to about 8.

The total residence time of catalyst in the apparatus can vary depending upon the number of zones and rate of travel through each zone. Generally, for ethylene polymerization catalysts, it is desirable to have a total residence time ranging from about 1 hour to about 20 hours or more and preferably ranging from about 4 to about 16 hours. This time is generally about evenly divided among the various zones, although this is not an invariable limitation.

The activator can be electrically heated or heated by the combustion of fuels or the treating gas can be preheated. Each zone can be independently heated, if desired, so that the catalyst can be treated at various temperatures as it progresses through the apparatus. For example, the first zone can be at about 800° F (427° C), the second zone can be at 1000° F (538° C), the third zone at 1200° F (649° C), the fourth through sixth zones at 1600° F (871° C), and the like. Catalyst passing through the last zone can be cooled and sent to storage.

It is presently preferred that relatively high activating fluid velocities be employed during the fluidizing/activating treatment. The bed is contacted with the activating fluid at superficial velocities in the range of about 0.01 to about 2 (0.3-60), more preferably from about 0.02 to about 0.5 feet per sec. (0.6-15 cm per sec.).

The fluid normally employed during activation is dry air although air enriched with oxygen, nitrogen enriched with oxygen, pure oxygen and the like can be utilized.

EXAMPLE I

The activation of two types of ethylene polymerization catalysts was accomplished. Catalyst 1, identified as MS, consisted of a commercially available microspheroidal silica containing about 0.1 wt. % alumina impregnated with sufficient aqueous chromium trioxide to give the equivalent of 2 wt. % chromium oxide on a dry basis. The composite was dried for several minutes in air at 200-400° F (93-204° C). Catalyst 2, identified as Cogel, consisted of a coprecipitated gel consisting of 97.5 wt. % silica and 2.5 wt. % titania and impregnated with sufficient aqueous chromium trioxide to give the equivalent of 2 wt. % chromium oxide on a dry basis. The wet gel was dried by azeotrope distillation with ethyl acetate. Each dried catalyst was screened to remove particles smaller than those passing through a number 230 U.S. sieve to minimize static charge effects on the remaining particles. Each catalyst was divided into two portions. One portion was fed as is to the continuous activator. The other portion was predried in a fluidized bed for 3 hours at 1100° F (593° C) to simulate catalyst dried in previous stages of drying in a multistage continuous activator.

As detailed in FIG. 1, the activator 1 was a tube constructed of quartz, 45 mm inner diameter. It contained two fluidized bed activation zones 3, 5. A thermowell 7 passed through the center of the tube, allowing temperature measurements throughout each catalyst bed. Each catalyst zone 3, 5 has its own regulated source of dry air 9, 11 to fluidize the catalyst. The dry air flowed from the source to a chamber 13, 15 where it was disseminated through grid floor 17, 19 to fluidize the catalyst bed. The fluidizing gas was released from the tube by way of outlet means 21, 23. The activator tube was inserted in a cylindrical furnace containing top and bottom-half heaters which were separately controlled and allowed each activation zone to be maintained at different temperatures, if desired.

Catalyst was slowly added to the top zone of the activator by means of a partially plugged ball valve 25 operated with an 0.5 amp. electric motor (not shown). The motor was operated intermittently, allowing addition of small amounts of catalyst at the desired rate. The bed depth 27, 29 in each zone was regulated by a 4 inch (10 cm) overflow tube 31, 33 through which excess catalyst was allowed to fall in the zone below. The catalyst volume in each activation zone was about 140 ml. The settled catalyst bed depth at ambient temperature was about 2 to 2.1 inches (5-5.3 cm). An even flow of catalyst from the feeder and from zone to zone was obtained by the use of small electric vibrators (not shown) to prevent catalyst deposition on the walls of the tube.

In this and the following examples, each activated catalyst was used to polymerize ethylene in a particle form process to a normalized yield of 5000 g polymer per g catalyst in an isobutane diluent at 550 psig (3792 kPa) and 230° F (110° C). The melt index of each polymer was determined according to ASTM D 1238-65T, condition E. The conditions used and results obtained are presented in Table 1.

EXAMPLE II

Another activator, like that described in Example I, was attached to the first activator to give a 4 zone arrangement. A portion of cogel catalyst described in Example I was used in each activation run. To simulate one heat activation zone, the catalysts shown in Table IIA were predried at 800° F (427° C) in a 6-inch bed depth batch activator for 3 hours at a superficial air velocity of 0.1 ft/sec. To simulate two heat activation zones, the catalysts shown in Table IIB (except the control) were predried at 1100° F in a 6-inch bed depth batch activator for 3 hours at a superficial air velocity of 0.1 ft/sec.

In the continuous activator, those catalysts of Table IIA were activated in each zone with air flowing at the rate of 42 liters/hour (0.1 ft/sec linear velocity). Those catalysts of Table IIB were activated in each zone with air flowing at the rate of 50 liters/hour (0.12 ft/sec linear velocity).

The activation conditions used and results obtained are shown in Tables IIA and IIB.

TABLE I

Two-Stage Continuous Catalyst Activation

| Run No. | Type | Pre-drying Temp. °F | Conditions Time, hrs. | Activator Temperatures °F Zone 1 | Zone 2 | Air Flow[1] (1/hr) | (ft/sec) | Catalyst Addition Rate (g/hr) | Total Catalyst Residence (hrs.) | Catalyst Surface Area (m²/g) | Properties Pore Volume (cc/g) | Polymer Melt Index | Remarks |
|---|---|---|---|---|---|---|---|---|---|---|---|---|---|
| 1 | MS[2] | none | — | 1300 | 1500 | 13 | 0.03 | 4.7 | 4 | 252 | 1.62 | 0.61 | |
| 2 | MS[2] | 1100 | 3 | 1300 | 1500 | 15 | 0.04 | 3.0 | 6 | 258 | 1.77 | 0.84 | |
| 3 | MS[2] | Batch activation in 4-inch depth fluidized bed at 1600° F[3] | | | | | | — | 5 | 244 | 1.75 | 0.94 | control |
| 4 | cogel | none | — | 1300 | 1500 | 20 | 0.05 | 2.3 | 8 | 464 | 2.31 | 2.6 | |
| 5 | cogel | 1100 | 3 | 1400 | 1600 | 33 | 0.08 | 1.7 | 11 | 383 | 2.35 | 3.4 | |
| 6 | cogel | Batch activation in 4-inch fluidized bed depth at 1600° F[3] | | | | | | — | 5 | — | — | 4.7 | control |

Notes
[1]Calculated at standard conditions.
[2]Microspheroidal Silica
[3]Superficial air flow rate of 0.1 ft/sec.

The results in runs 1 and 4 show that adding raw (undried) catalyst to a high temperature zone (1300° F) is not desirable due to poor removal of the combined water in one step. This was indicated in runs 2 and 5 in which each catalyst was predried at 1100° F in a batch activator for 3 hours before each was passed through the continuous activator. The improvement in the performance of each catalyst is reflected in the melt index of polyethylene made by contact with each catalyst at the polymerization conditions used. The results of runs 2 and 5 suggest that additional zones in the continuous catalyst activator would be beneficial to obtain results equivalent to those exhibited by batch activation of catalyst.

TABLE II

Four-Stage Continuous Cogel Catalyst Activation

| Run No. | Activator Temperatures, °F Zone 1 | Zone 2 | Zone 3 | Zone 4 | Catalyst Added (g/hr) | Catalyst Lost Overhead (wt. %) | Hours Catalyst Addition Before Sampling | Collected Activated Catalyst (g/hr) | Average[1] Catalyst Residence Time (hrs) | Polymerization Run length (min.) | Polymer[2] Melt Index |
|---|---|---|---|---|---|---|---|---|---|---|---|
| 1 | 1100 | 1400 | 1600 | 1600 | 5.0 | 20 | 22 | 4.0 | 4.6 | 41 | 2.8 |
| 2 | 1100 | 1300 | 1500 | 1600 | 6.7 | 24 | 9.5 | 5.1 | 3.6 | 45 | 2.1 |
| 3 | 1300 | 1600 | 1600 | 1600 | 5.7 | 19 | 17 | 4.6 | 4.0 | 37 | 2.9 |
| 4 | 1100 | 1400 | 1600 | 1600 | 2.8 | 21 | 24 | 2.2 | 8.4 | 47 | 2.1 |
| 5 | 1100 | 1400 | 1600 | 1600 | 2.5 | 23 | 43 | 2.0 | 9.2 | 48 | 2.3[3] |
| 6 | 1300 | 1600 | 1600 | 1600 | 2.8 | 28 | 20 | 2.0 | 9.2 | 45 | 2.1 |

Notes
[1]Based on catalyst collected in receiver.
[2]Normalized for 5000 g polymer per g catalyst yield.
[3]Catalyst sample was reactivated in a batch activator at 1600° F. A polymer of 2.4 melt index was subsequently produced by this catalyst.

TABLE IIB

Four-Stage Continuous Cogel Catalyst Activation

| Run No. | Activator Temperatures, °F Zone 1 | Zone 2 | Zone 3 | Zone 4 | Catalyst Added (g/hr) | Catalyst Lost Overhead (wt. %) | Hours Catalyst Addition Before Sampling | Collected Activated Catalyst (g/hr) | Average[1] Catalyst Residence Time (hrs) | Polymerization Run length (min.) | Polymer[2] Melt Index |
|---|---|---|---|---|---|---|---|---|---|---|---|
| 1 | 1300 | 1500 | 1600 | 1600 | 6.0 | 24 | 16 | 4.6 | 4 | 42 | 3.8 |
| 2 | 1300 | 1500 | 1600 | 1600 | 5.7 | 19 | 25 | 4.6 | 4 | 40 | 4.0 |
| 3 | 1400 | 1600 | 1600 | 1600 | 5.4 | 24 | 12 | 4.1 | 4.5 | 42 | 3.3 |
| 4 | 1400 | 1600 | 1600 | 1600 | 4.6 | 22 | 18.5 | 3.6 | 5.1 | 38 | 4.1 |
| 5 | 1400 | 1600 | 1600 | 1600 | 2.7 | 26 | 22 | 2.0 | 9.2 | 85 | 4.1 |
| 6 | 1400 | 1600 | 1600 | 1600 | 3.4 | 25 | 39 | 2.0 | 9.2 | 38 | 4.4 |
| 7 | 1400 | 1600 | 1600 | 1600 | 8.7 | 17 | 8 | 7.2 | 2.6 | 37 | 3.7 |
| 8 | Batch activation, 4" fluidized bed depth at 1600° F. 42 1/hr air flow | | | | | | | 5.0 | | 36 | 4.7 |

Notes
[1]Based on catalyst collected in receiver.
[2]Normalized for 5000 g polymer per g catalyst yield.

A typical cogel catalyst, when employed in the polymerization of ethylene under the conditions used in all the runs, is capable of producing polyethylene having a melt index of about 4.7 as shown in run 8 Table IIB.

Based on melt index values obtained for the polymers the results in runs 1-3 of Table IIA indicate that predrying the catalyst at 800° F did not remove sufficient water to prevent harming the catalyst when it was further exposed to the higher temperatures used in the continuous activator. The results in these runs also show that at least two and preferably three final activation zones at 1600° F produced the best results.

Based on polymer melt indices produced with the catalysts the results shown in runs 1-5 in Table IIB indicate that predrying the catalyst at 1100° F appears to have removed enough absorbed water to avoid the harmful effect that moisture has on activated catalysts. The polymer melt index results are significantly better than those noted in Table IIA and in fact approach that of the control catalyst shown in run 8. Some increase in melt index capability was obtained by extending the catalyst residence time from about 4 to about 9 hours as the melt index results of run 6 demonstrate. Decreasing the residence time to less than about 4 hours also decreases the melt index capability of the catalyst activated in this fashion.

The results obtained in Examples I and II indicate that with at least 6 zones present satisfactory activated catalyst can be obtained in a continuous activator of the design. The last two or three are preferably maintained at about 1600° F. The first zone is maintained in the 600-800° F range. The second zone is held at about 1100° F and the third zone is held at about 1300-1400° F.

EXAMPLE III

Figure 2:
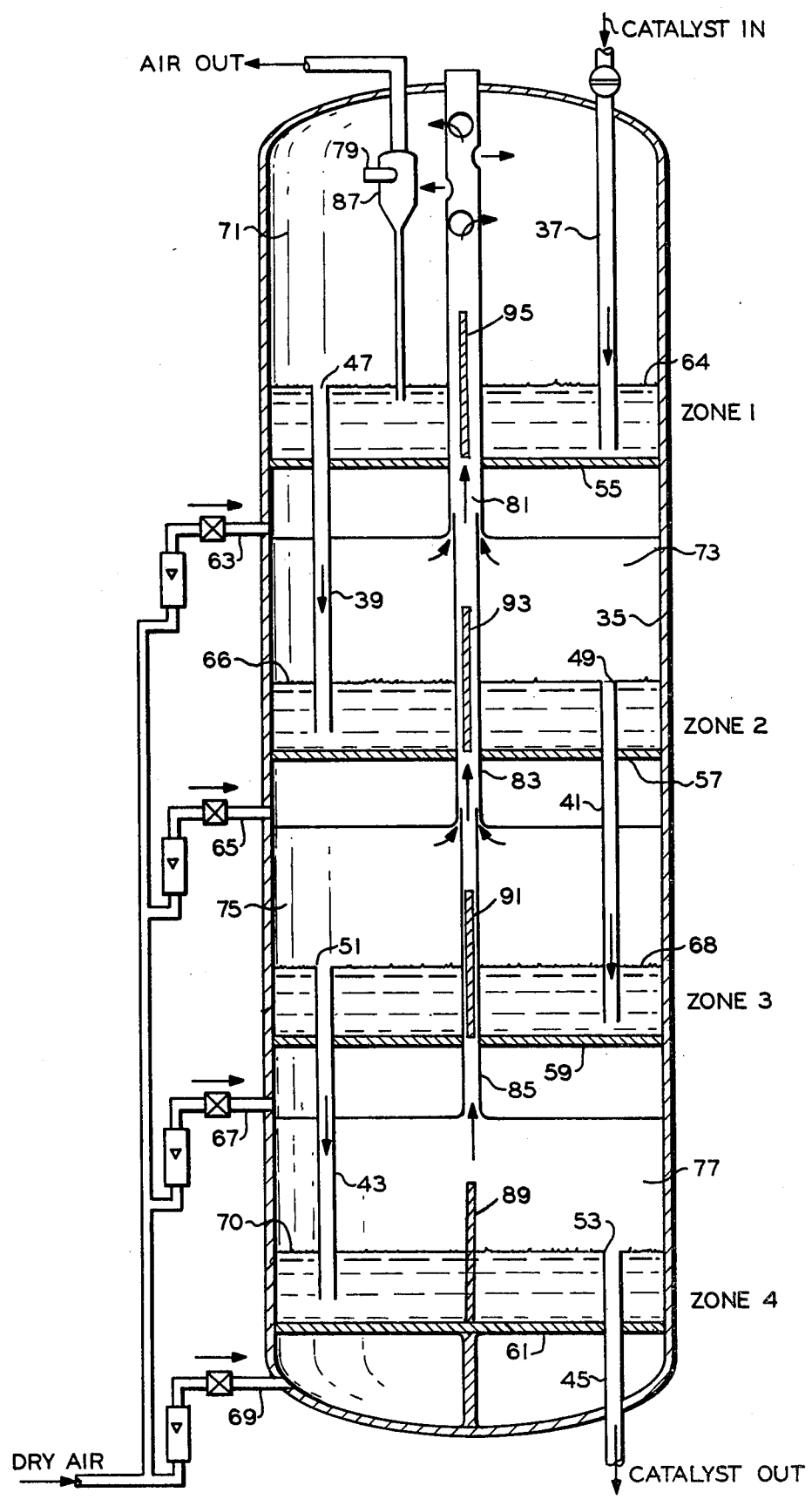
FIG. 2 is a representation of a commercial catalyst activator based on calculations established by experimental data optionally containing a partition of each bed.

Referring to FIG. 2, a four zone 71, 73, 75, 77, continuous activator 35 of calculated size for commercial use is depicted. This activator does not contain partitions 89, 91, 93 annd 95 which are additional elements to be discussed in Example IV. The overall length of the activator is 10 feet (3.0 m) and the internal diameter is 3 feet (0.91 m). A 1.5 inch ID (3.8 cm) tube 39, 41, 43 serves as means for conducting catalyst from one zone to the next lower zone. The tubes are alternately disposed as shown and each extends so that its inlet 47, 49, 51, 53 is 6 inches (15.2 cm) above a porous, sintered Inconel metal support 55, 57, 59, 61 that serves as the floor in each zone to define the level 64, 66, 68, 70 of fluidized catalyst in the beds. Catalyst overflowing one zone 71, 73, 75, 77 passes through the tube 39, 41, 43 to the next lower zone where it discharges at about 2 inches (5.1 cm) above the metal bed support 55, 57, 59, 61. Considering each zone as an independent chamber, the catalyst conducting tubes 39, 41, 43 can be viewed first as a means for conducting particulate solids from the chamber into the next zone and second as a means for conducting particulate solids into the chamber from the previous zone.

Each zone has means for individually supplying as fluidizing gas 63, 65, 67, 69 its own source of dry air at a superficial linear velocity of 0.12 ft/sec. Each zone has means for controlling the temperature therein, such as by electrically heating the individual chambers 71, 73, 75, 77. Zone 1 is maintained at 1100° F, zone 2 at 1400° F, and zones 3 and 4 are kept at 1600° F. Air leaving each zone passes into a means for conducting gases from the chamber, such as a centrally located exhaust pipe 81, 83, 85 and leaves the activator at the upper end through a cyclone separator 87 to remove entrained catalyst fines. Catalyst, predried at 800° F for about 3 hours in a fluidized bed, is fed through a tube 37 at a rate such that the average catalyst residence time in each bed is 4 hours. In this Example, production rate of activated catalyst amounts to 200 lbs/day or about 8.33 lbs/hour. Volume of catalyst contained in each fluidized bed amounts to about 3.51 ft$^3$ (0.099 m$^3$).

Cogel catalyst similar to that described in Examples I and II is activated in the manner outlined. The catalyst is used to polymerize ethylene in a particle form process in isobutane diluent at 550 psig and reaction temperature of 230° F. At a yield of 5000 g polymer per g catalyst, it is found that the melt index of the resulting polyethylene is 4.7.

EXAMPLE IV

In a 7.5 inch ID by 90 inch long activator similar to that shown in FIG. 2 of the drawing and containing partitions 89, 91, 93, and 95, but with other elements essentially the same as described in Example III, catalyst was passed through four zones to obtain the data set forth below in Tables III and IV.

Each fluidization zone was provided with a 2 inch space for air entrance below the fluidization plate 55, 57, 59, 61. The air flow rate was metered with a calibrated rotometer. Each fluidization plate contained approximately 173, 0.035 inch diameter holes on a $\frac{1}{4}$ inch spacing. Each of the partitions 89, 91, 93, 95, rose 12 inches and was welded to the fluidization plate. The activator walls 35 were made of half cylinders, which were welded to the plates 55, 57, 59, 61 and the partitions 89, 91, 93, 95 to form a cylinder. For catalyst transfer, a $\frac{1}{8}$ inch diameter hole 97 (FIG. 3, FIG. 4) was drilled through each partition $\frac{1}{2}$ inch above the fluidization plate and 1 inch from the outer wall. Sizing of the transfer hole in the partitions was based on the need for catalyst transfer without appreciable difference in bed height, at the same time avoiding appreciable bed mixing.

Figure 3:
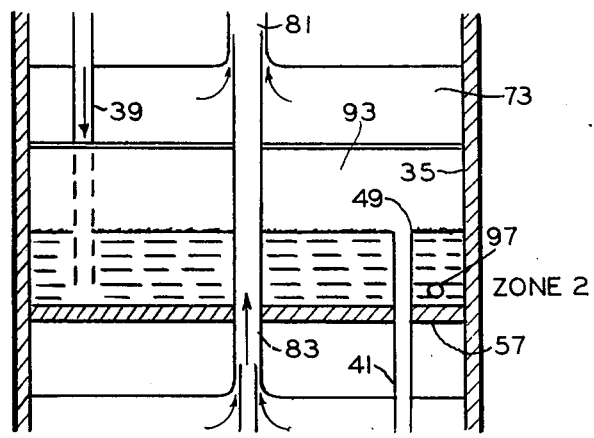
FIG. 3 is a side view from FIG. 2.

Referring to FIG. 3, which is a view of zone 2 at a 90° angle on the right side as viewed in FIG. 2, the placement of the partition 93 can be better appreciated in its relation to the downcomer 39 which is the inlet means for catalyst into the first side of the chamber and the catalyst outlet means 41 on the second side of the partition. The treated particles pass from the first side of partition 93 to the second side through transfer hole 97. It is apparent that partition 93 does not reach the top of chamber 73.

Figure 4:
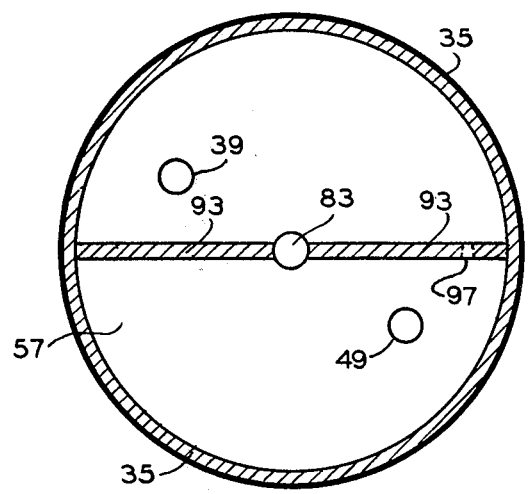
FIG. 4 is a top view of a catalyst bed showing relationship of partition, inlet, and outlet.

Referring now to FIG. 4 which is a view of zone 2 looking toward the fluidization plate 57, the preferred placement of the partition 93, the inlet line 39 and the outlet line 49 in relation to the transfer hole 97 is shown. The inlet 39 and outlet 49 are preferably in a plane which passes through a diameter of the apparatus situated one on either side of the partition 93 with the transfer hole 97 located in a portion of the partition close to the outlet line 49. This arrangement provides for a minimum of bypassing of particulate matter from the first side of the partition to the second side of the partition.

Table III

Four-Stage Continuous Catalyst Activation with Partitioned Activation Zones

| Run No. | Activator Temp. °C. Zone 1(Top) | Zone 2 | Zone 3 | Zone 4 | Catalyst Feed Rate, lbs/day | Catalyst Re-Covered Wt. % | Residence Time, Hrs. Total in Activator | Operation[4] at Stated Conditions, Hrs. | Catalyst Recovered lbs/day | Catalyst Characteristics Surface Area, M²/g | Pore Volume cc/g | Polymerization Run[3] Length Minutes | Melt Index |
|---|---|---|---|---|---|---|---|---|---|---|---|---|---|
| 1 | 482 | 565 | 649 | 649 | 11.7 | 60 | 13.2 | 13.25 | 7 | 334 | 1.81 | 70 | 0.17 |
| 2 | | | | | | | | 39.25 | | 336 | 1.77 | 78 | 0.17 |
| 3 | | | | | | | | 42.5 | | 333 | 1.83 | 72 | 0.15 |
| 4 | 482 | 649 | 760 | 760 | 13.3 | 53 | 11.6 | 25 | 7 | 310 | 1.81 | 56 | 0.59 |
| 5 | | | | | | | | 37 | | 298 | 1.91 | 70 | 0.59 |
| 6 | 482 | 677 | 815 | 815 | 15.2 | 53 | 10.2 | 15.5 | 8 | 290 | 1.92 | 58 | 0.75 |
| 7 | | | | | | | | 24 | | 284 | 1.97 | 54 | 0.95 |
| 8 | | | | | | | | 33.5 | | 278 | 1.98 | 57 | 0.85 |
| 9 | 482 | 677 | 815 | 815 | 23.8 | 71 | 6.8 | 8.25 | 17 | 293 | 1.93 | 59 | 0.78 |
| 10 | | | | | | | | 16.25 | | 297 | 1.89 | 57 | 0.86 |
| 11 | | | | | | | | 18.25 | | 286 | 1.87 | 60 | 0.79 |
| 12 | 482 | 677 | 815 | 815 | 27.2 | 63 | 5.8 | 6 | 17 | 295 | 1.95 | 53 | 0.83 |
| 13 | | | | | | | | 12 | | 294 | 1.96 | 60 | 0.73 |
| 14 | | | | | | | | 19 | | 297 | 1.98 | 65 | 0.72 |
| 15 | | | | | | | | 25 | | 297 | 1.89 | 61 | 0.89 |
| 16[1] | | | 649 | | | | | | | — | — | 80 | 0.16 |
| 17[1] | | | 760 | | | | | | | — | — | 62 | 0.44 |
| 18[1] | | | 815 | | | | | | | — | — | 60 | 0.57 |
| 19[1] | | | 815 | | | | | | | — | — | 62 | 0.59 |
| 20 | 482 | 677 | 815 | 815 | 12.1 | nd[5] | 9.8 | 9.8 | nd[5] | 487 | 2.01 | 38 | 3.1 |
| 21 | | | | | 12.1 | 66 | 10.2 | 12 | 8 | 514 | 2.19 | 38 | 4.0 |
| 22[2] | | | | 815 | | | | | | — | — | 40 | 3.3 |
| 23[2] | | | | 815 | | | | | | — | — | 38 | 3.7 |

Notes
[1]Batch activation, 48 mm diameter quartz activator using 6 inch bed depth and microspheroidal particles.
[2]Batch activation, in 48 mm diameter quartz activator using 6 inch fluidized bed depth cogel.
[3]Activated catalysts were tested as particle form polymerization catalysts in isobutane at 110° C (230° F) at 3.8 MPa (550 psig).
[4]Sample removed for polymerization test.
[5]Not determined.

The data in this table show that catalyst suitable for particle form polymerization can be made using the partitioned catalyst treating apparatus of this invention employing various conditions. The melt indices obtained in the invention runs 1-15 are equal or better than those obtained in the control runs 16-19 with the same type of microspheroidal catalyst. Similarly, the results of invention runs 20 and 21 are comparable to the results of the control runs 22 and 23 using cogel catalyst. In both cases, the control runs were batch activation in a single bed.

The catalyst characteristics were not determined for the batch activated samples.

Table IV

Catalyst for Solution Polymerization

| Run No. | Activator Temp., °C. Zone 1(Top) | Zone 2 | Zone 3 | Zone 4 | Catalyst Feed Rate, lbs/day | Catalyst Re-Covered Wt. % | Residence Time, Hrs. Total in Activator | Operation[3] at Stated Conditions, Hrs. | Catalyst Recovered lbs/day | Catalyst Characteristics Surface Area, M²/g | Pore Volume cc/g | (146° C) Polymerization Run Length Minutes | Melt[2] Index |
|---|---|---|---|---|---|---|---|---|---|---|---|---|---|
| 1 | 427 | 538 | 538 | 538 | 27.6 | 62 | 6.2 | 8.5 | 17 | 246 | 1.57 | 60 | 16.1 |
| 2 | | | | | | | | 22 | | 245 | 1.52 | 60 | 14.6 |
| 3 | | | | | | | | 28.5 | | 212 | 1.51 | 60 | 16.7 |
| 4 | | | | | | | | 30 | | 325 | 1.46 | 60 | 15.1 |
| 5 | 427 | 538 | 593 | 593 | 27.6 | 56 | 6.2 | 9 | 154 | 240 | 1.46 | 60 | 19.9 |
| 6 | | | | | | | | 17 | | 279 | 1.46 | 60 | 19.2 |
| 7 | 427 | 538 | 593 | 593 | 18.4 | 60 | 9.2 | 4 | 11 | 257 | 1.53 | 60 | 17.8 |
| 8 | | | | | | | | 8.75 | | 249 | 1.46 | 60 | 17.6 |
| 9 | | | | | | | | 13.75 | | 236 | 1.50 | 60 | 20.9 |
| 10 | 427 | 538 | 565 | 565 | 18.4 | 65 | 9.2 | 18 | 12 | nd[4] | nd[4] | 60 | 19.9 |
| 11 | | | | | | | | 30.25 | | 270 | 1.50 | 60 | 20.5 |
| 11A | | | | 593 | | | | | | nd[4] | nd[4] | 60 | 21.7 |

(151° C) Polymerization

| 12 | 454 | 538 | 538 | 538 | 35 | 79 | 9.2 | 9.5 | 27 | 569 | 0.72 | 60 | 0.54 |
| 13 | | | | | | 33 | 58 | 19 | 19.2 | 583 | 0.67 | 60 | 0.66 |
| 14 | | | | | | 33 | 58 | 27.75 | 19.2 | 549 | 0.73 | 60 | 0.61 |
| 15 | 454 | 538 | 538 | 538 | 28.3 | 70 | 11.2 | 11.5 | 19.7 | 736 | 0.75 | 60 | 0.64 |
| 16 | 454 | 538 | 538 | 538 | 23 | 50 | 13.8 | 14 | 11.5 | 568 | 0.71 | 60 | 0.57 |
| 17 | | | | 538 | 23 | 50 | | 28 | 11.5 | 461 | 0.70 | 60 | 0.59 |
| 18[1] | | | | 538 | | | | | | nd[4] | nd[4] | 60 | 0.51 |

Notes:
[1]Batch activation, in 48 mm diameter quartz activator using 30 ml catalyst charge 146° C polymerization and 151° C polymerization.
[2]Activated catalysts were tested for solution polymerization catalysts in cyclohexane at temperatures indicated and 2.42 MPa (350 psig), test duration of 60 minutes.
[3]Sample removed for polymerization test.
[4]Not determined.

The data in the table above demonstrate that catalysts for solution polymerization equivalent to those activated in a batch activation system can be made using the activation technique of this invention. Comparison of run 11A, control, with runs 1-11 and run 18, control, with runs 12-17 show that equivalent melt index polymer can be obtained using batch activation and the continuous activation of the present invention. The commercially available catalyst employed in runs 1-11A was MS catalyst containing 2 weight percent ammonium silicofluoride. The commercially available catalyst employed in runs 12–18 differs from the MS catalyst employed in runs 1–11A in surface area and pore volume as the catalyst characteristic values recorded show. The difference in catalyst characteristics is reflected in the different polymer melt index values obtained when using said catalysts for ethylene polymerization.

We claim:

1. A multiple zone apparatus for contacting particulate solids with treating gas wherein
   (1) each zone is a chamber comprising:
      (a) a floor of porosity sufficient to admit fluidizing gas therethrough and to retain thereon the particulate solids to be treated;
      (b) a means for supplying fluidizing gas through said floor;
      (c) a means for conducting particulate solids out of said chamber having a port sufficiently above said floor to maintain a level of fluidized particles above said floor;
      (d) a means for conducting particulate solids into said chamber positioned to discharge at a level lower than the port of said means for conducting particulate solids from said chamber;
      (e) a means for conducting gases from said chamber, said means for conducting gases having opening above the level of fluidized particulate solids; and
   (2) said zones arranged for gravity overflow of treated particles from each zone to a next treatment zone with overflow from the apparatus from the last treating zone; and
   (3) said means for conducting gas arranged to conduct gases to a common collection point without intermingling said gases with fluidized particulate solids in another chamber.

2. An apparatus of claim 1 wherein there is means for controlling the temperature of each chamber.

3. An apparatus of claim 1 wherein there is means for recovering entrained solids from said gases with return of recovered solids to a treatment zone.

4. A method for contacting particulate solids with treating gas wherein said particulate solids are passed through a multiple zone apparatus of claim 1 with gravity overflow of treated particles from each zone to a next treatment zone with overflow from the last treating zone being treated product.

5. A method of claim 1 wherein the temperature of each chamber is individually controlled.

6. A method of claim 5 wherein the temperature of each chamber is controlled by individual heating means for each chamber.

7. A method of claim 5 wherein means for controlling the temperature comprises a means for preheating said treating gas.

8. A method of claim 4 wherein said particulate solids are polymerization catalysts.

9. A method of claim 8 wherein said catalysts are ethylene polymerization catalysts.

10. A method of claim 9 wherein said ethylene polymerization catalysts comprise (1) a chromium compound and (2) silica or a silica admixed with up to about 20 weight percent of one or more metal oxides.

11. An apparatus of claim 1 wherein each zone is a chamber additionally comprising (f) a partition transversely dividing the chamber into a first side and a second side, said partition of height greater than the fluidized bed contained in the chamber and solidly extending across the chamber to prevent flow between said first side and said second side except through a transfer hole located in said partition.

12. An apparatus of claim 11 wherein the transfer hole is sized to permit a maximum flow from the first side of the partition to the second side of the partition with minimum backflow.

13. An apparatus of claim 12 wherein the particle transfer hole is sized within the range of about 0.008 to about 0.025 times the diameter of the chamber.

14. A method for contacting particulate solids with treating gas wherein said particulate solids are passed through a multiple zone apparatus of claim 11 with gravity overflow of treated particles from each zone to the next treatment zone with overflow from the last treating zone being treated product.

* * * * *